United States Patent [19]
Bleifuss

[11] 3,910,786
[45] Oct. 7, 1975

[54] HIGH TEMPERATURE DIRECT REDUCTION PROCESS FOR IRON ORE AGGLOMERATES

[75] Inventor: Rodney L. Bleifuss, Coleraine, Minn.

[73] Assignee: The Regents of the University of Minnesota, Minneapolis, Minn.

[22] Filed: Apr. 9, 1974

[21] Appl. No.: 459,391

[52] U.S. Cl. ................................ 75/34; 75/3
[51] Int. Cl.² ................................ C21B 13/08
[58] Field of Search .................. 75/3, 33–35

[56] References Cited
UNITED STATES PATENTS
2,964,383  12/1960  Kamlet ........................... 75/33 X
3,375,099  3/1968   Marshall ......................... 75/35
3,682,621  8/1972   Struve ............................ 75/34

Primary Examiner—L. Dewayne Rutledge
Assistant Examiner—M. J. Andrews

[57] ABSTRACT

A practical process for carrying out direct reduction of iron-rich materials in the temperature range from about 1100° to 1300° C. The process is directed primarily toward the direct reduction of iron ore concentrates which have been suitably agglomerated, such as taconite pellets, and in which the silica has been suitably prefluxed with lime to prevent the reaction of FeO and silica during reduction. Prefluxing the silica with lime prevents the formation of an FeO-silica slag and makes it feasible to carry out direct reduction at temperatures up to 1300° C without attendant fusion of the agglomerates.

9 Claims, 1 Drawing Figure

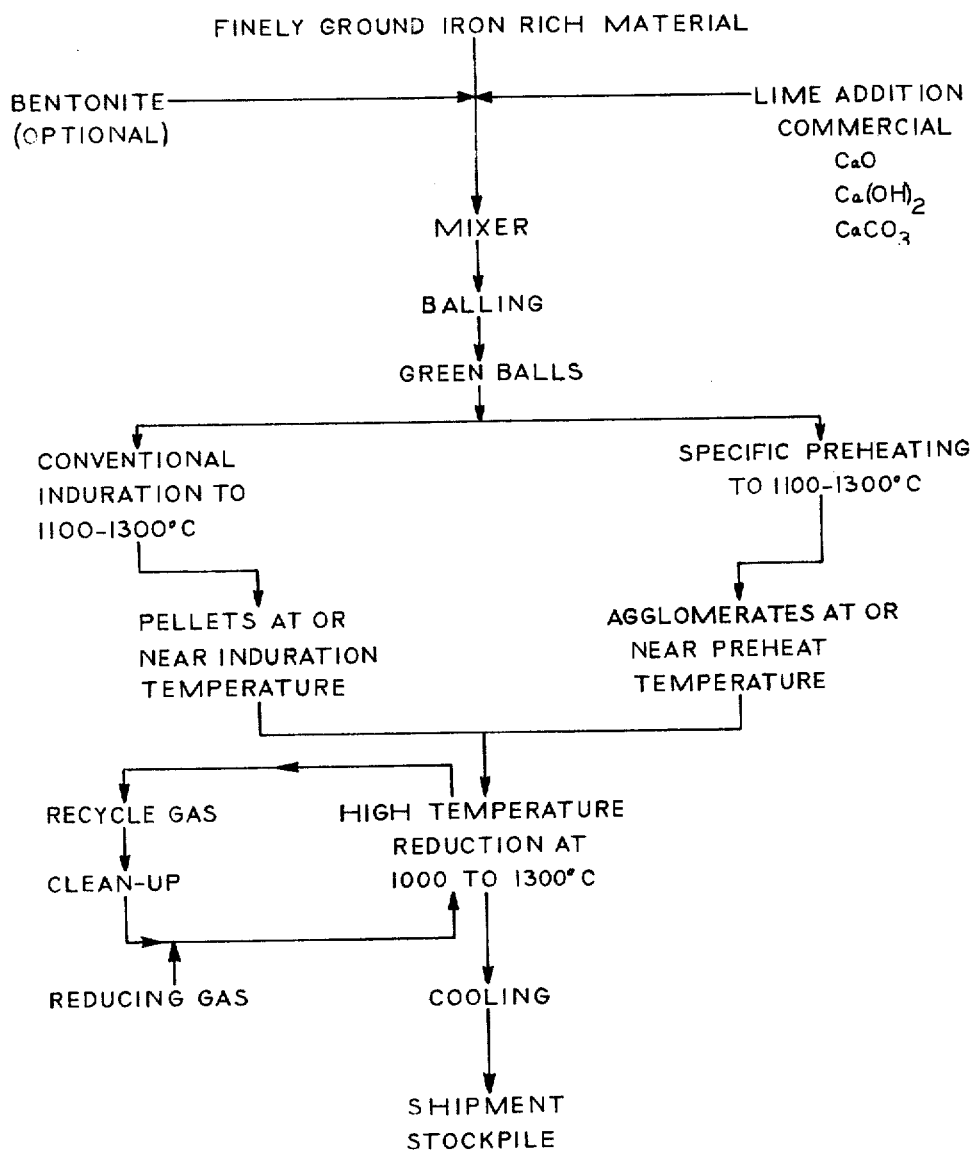

HIGH TEMPERATURE DIRECT REDUCTION PROCESS FOR IRON ORE AGGLOMERATES

The invention applies to the direct reduction of iron ores or iron oxide agglomerates. Direct reduction in the iron and steel industry applies in general to processes that are aimed at bypassing the conventional blast furnace iron making method. The methods heretofore developed operate below the fusion point of iron and usually below the fusion point of potential slagging constituents. The product is partly metallized iron (usually greater than 90%) and whatever indigenous gangue constituents are present in the feed ore. The product, if it has a low enough gangue content, is usually treated directly in an electric arc furnace as a replacement or supplement for the normal scrap iron charge. Some processes working on lower grade ores require additional grinding and magnetic separation after reduction to reduce the total gangue content before it is sent on to an electric furnace for refining.

The present invention is designed to carry out direct reduction at substantially higher temperatures without fusion of either the iron or the slag phases. Thus it becomes feasible to take the discharge from a conventional indurating machine, such as a grate-kiln, at the indurating temperature and convert it directly to iron at that temperature in a nominally isothermal reactor.

The addition of limestone to pellets and sinter, i.e., self-fluxing sinters and pellets, intended for consumption in the blast furnace has been proposed previously. The purpose was to improve blast furnace behavior by reducing the energy lost in calcining and to improve the $CO/CO_2$ balance in the blast furnace stack. The prefluxing was also aimed at controlling the final chemistry of the liquid slag in the hearth and modifying the meltdown behavior of the burden in the mantle and hearth areas of the furnace. By contrast the present invention is aimed at controlling the slagging characteristics of the agglomerates so as to enable solid state direct reduction of the iron oxides to go essentially to completion at high temperatures without the formation of liquid slag phase.

The invention provides five major advantages over previous direct reduction systems:

1. The high temperature allows very rapid reduction rates.
2. The rapid reduction rates allow the use of smaller reactor vessels and consequently greatly reduced capital cost.
3. The product is stable and nonpyrophoric.
4. Reduction at temperature allows the conservation and utilization of the thermal energy of the indurating step.
5. Conventional taconite concentrates that contain several percent of silica can be efficiently processed.

Direct reduction processes have been studied intensively over the last several decades. Several processes have been developed and at least six have seen commercial application. The present state of knowledge is summarized in three recent publications: "Iron Ore Reduction" ed. by R. R. Rogers; "Blast Furnace-Theory and Practice, Volume II", ed. by J. H. Strassburger; and "The Reduction of Iron Ores", L. Von Bogdandy and H. J. Engell. Six processes that have seen commercial trials are briefly described below:

| Process | Fuel | Reactor | Temperature | Product |
| --- | --- | --- | --- | --- |
| Krupp-Renn | Coal + coke | Rotary kiln | 1250 C* | Nodules or "luppen" for Electric Furnace |
| Wiberg | Coke + elec. | Shaft furnace | 1000 C | Metallized pellets for E. F. |
| Nu-Iron | Nat.gas | Fluosolids | 775 C | Sponge for E. F. (briquetted) |
| Midrex Proc. | Nat.gas | Shaft furnace | 1050 C | Metallized pellets for E. F. |
| SL/RN | Coke + gas or fuel oil | Rotary kiln | 1100 C | Metallized pellets for E. F. |
| HyL | Nat.gas | Retorts | 1000 C | Metallized pellets and ore for E. F. |

*This is a two-stage process carried out in the same kiln; in the first part of the kiln metallization is carried out below 1100° C. In the latter part, the temperature is increased to 1250° C and the slag undergoes incipient fusion and the iron coalesces as small modules or "luppen".

All of these operations except the Krupp-Renn are tied to conventional electric furnace operations and are predicated on the reduction of very high grade ores or pelletized concentrates containing about 2 percent silica or less. The very low silica requirement is demanded by current operations because the metallized product is being used as a substitute for scrap iron which carried a very low slag or gangue fraction. The current operations are limited to locations which have specifically favorable economic situations. Fuel requirements and capital cost are the two major obstacles to greatly expanded direct reduction facilities when they attempt to compete with an established and amortized conventional blast furnace facility. The present invention provides a means by which it is possible to achieve substantial improvements in both of these critical cost areas.

Research carried out by applicant has shown that proper prefluxing of the silica in iron ore pellets or agglomerates with lime in the induration or preheating step to form lime-silicates, or a lime-silica slag phase, prevents the formation of low melting point FeO-silica minerals or slags during reduction of the higher oxides of iron to metallic iron. This permits direct reduction processes to be carried out at high temperatures between about 1100° to 1300° C, without fusion of the reactants. These are temperatures substantially higher than the present practical maximum of about 1150° C. The preheating or induration step is essential in the preparation of the agglomerate so that the added lime has sufficient time at temperature in an atmosphere in which hematite is the stable iron oxide for the lime-silica reactions to be substantially completed. If the lime-silica reactions are not completed then, during the consequent reduction stage, the free lime, free silica, and FeO that is formed by reduction will react to form low melting point FeO-CaO-SiO$_2$ slag phases that will cause fusion of the reactants. The added lime may be in any appropriate form such as burnt lime, lime hydrate, or limestone. The purity of the lime additive is not critical but requires only that there be sufficient flux available to react with the silica of the pellet.

The direct reduction process, according to the present invention, is illustrated and described in conjunction with the flow sheet shown in the accompanying drawing.

Finely ground iron-rich materials, such as taconite concentrates, are utilized as the starting material. As is well known in the art, taconite concentrates are high in silica, low in alumina and magnetitic in character. Bentonite may optionally be added as a binder. Lime is added in the form of calcium oxide (CaO), calcium hydroxide (CaOH$_2$) or calcium carbonate (CaCO$_3$). The function of the lime is to chemically combine with whatever free silica is present in the ore. Free or reactive silica is silica available for reaction with FeO during reduction to form FeO-rich slags or FeO-silicate minerals. This includes silica present in the crude ore as quartz, low-grade metamorphic silicates such as minnesotaite, stilpnomelane or greenalite and high-grade metamorphic silicates such as cummingtonite and olivine. The silica may be combined with the lime either as a distinct mineral phase or as a lime-silicate slag.

Successful application of the process does not require total incorporation of the silica in the lime-silica phase. Instead, the lime reduces the free, or reactive, silica, i.e. silica that might combine with FeO during reduction, to a tolerable level. The level of reactive silica should be reduced to less than about 2.5 percent, and preferably less than 1.5 percent, based on the weight of the starting material. Although experimental data indicates that lower basicity-acidity ratios, such as B/A=1, give more rapid reduction, other factors such as pellet stability during reduction enter in.

The theoretical amount of burnt lime needed (at B/A = 1) to deactivate all the reactive silica in an iron ore is about 93 percent of the weight of silica present. Some examples are given in the following table. Also included are the equivalent proportions of calcium hydroxide or carbonate for complete silica deactivation. The percentages are of the iron ore weight.

| % Silica In Iron Ore | Add for complete deactivation | | | Add for all but 2.5% silica |
|---|---|---|---|---|
| | % CaO | % Ca (OH)$_2$ | % CaCO$_3$ | % CaO |
| 2.4 | 2.2 | 3.0 | 4.0 | 0 |
| 3.5 | 3.3 | 4.3 | 5.8 | 0.9 |
| 4.9 | 4.6 | 6.0 | 8.2 | 2.2 |
| 7.4 | 6.9 | 9.1 | 12.3 | 4.6 |

After addition of the lime and thorough admixture with the ore, the material is passed through a balling mill to produce "green" or unfired balls. Thereafter, the balls may be subjected to either of two alternative procedures. The balls may be subjected to conventional induration, as on a conventional pelletizing machine, at temperatures between about 1100° and 1300° C. The materials from the pelletizing machine are then discharged at about the induration temperature into a high temperature reduction vessel. This conventional induration involves a relatively long period during which the pellet is maintained at nearly peak temperatures to insure complete reaction of the iron oxides to give the pellets high strength so that they can be shipped without degradation. Since high strength is not necessarily required when the balls are going directly to a reduction vessel at high temperatures, the balls may instead be specifically preheated to between 1100° and 1300° C and then fed into a high temperature reduction vessel at about the preheat temperature. Only enough preheating time is necessary for the lime-silica reactions to proceed sufficiently to effectively reduce the free and reactive silica levels to a tolerable level less than about 2.5 percent. Reducing atmospheres including hydrogen, carbon monoxide and mixtures thereof, and gases such as water gas, producer gas and the like, may be used. The gas from the reduction vessel is desirably recycled, cleaned up and replenished with newly introduced reducing gas. Substantially complete reduction of the ore is achieved in less than about one half to one hour. The reduced pellets are cooled and stockpiled for shipment, or charged directly to an electric furnace. The process is equally applicable to agglomerates produced by other methods than pelletizing, as by nodulizing or sintering.

For test purposes, laboratory compacts were prepared from a Minnesota high grade taconite concentrate containing 2.39 percent silica. Compacts of higher silica content, 3.5 percent, 4.9 percent and 7.4 percent, were made by adding silica from glass-qualilty St. Peter sandstone pulverized to minus 325 mesh. The compacts were prepared using 5 grams of concentrate compressed in a ½ inch diameter cylindrical mold at 6,000 psi and fired for 2 hours at 1300° C. Lime additions were made with reagent grade calcium hydroxide.

Reduction tests were run on single compacts in a thermal-balance apparatus in which the samples were suspended in a vertical tube furnace by a chromel-alumel wire from a dynamometer and the weight loss displayed on an X-Y recorder. The reducing gases used in the tests were a mixture of carbon monoxide and hydrogen introduced at the rate of 800 and 1600 cc/min, respectively. The normal test cycle allowed 5 minutes for the pellet to reach thermal equilibrium in air followed by a 30 second nitrogen purge to displace the air and then introduction of the reducing gas mixture.

The effect of increasing the reduction temperature on the rate of reduction of oxide compacts containing 4.9 percent silica was measured at 900°, 1000°, 1100°, 1200°, 1250° and 1300° C. The reduction rates at 900°, 1000° and 1100° C are nearly identical and show rapid initial reduction with a gradual decrease in rate as the reaction nears completion. However, at 1200°, 1250° and 1300° C, the initial reduction is rapid but slows drastically as the FeO-silica slag block develops in the pellet. The higher the reduction temperature, the sooner the reduction slows with the result that less than 80 percent reduction is obtained at 1200° C, less than 60 percent at 1250° C, and less than 45 percent at 1300° C.

Then the effect of increasing silica on the reduction behavior of the pellets was studied at 1100°, 1200°, 1250° and 1300° C using compacts containing 2.4 percent, 3.5 percent, 4.9 percent and 7.4 percent silica. At 1100° C, the addition of silica has a moderate slowing effect on the rate of reduction but does not prevent attaining nearly complete reduction at any of the silica levels tested. At 1200° C, compacts with 4.9 percent silica achieve less than 80 percent reduction, with 7.4 percent silica less than 45 percent reduction, whereas compacts with 2.4 and 3.5 percent silica, respectively, achieve substantially complete reduction. At 1250° C, pellets with 2.4 percent silica achieve substantially complete reduction, pellets with 3.5 percent silica fail to reduce completely, pellets with 4.9 percent silica achieve less than 60 percent reduction, and pellets with 7.4 percent silica achieve less than 45 percent reduction. At 1300° C, none of the pellets achieve complete reduction. At 2.4 percent silica, less than 70 percent reduction is achieved; at 3.5 percent silica, less than 50 percent reduction; at 4.9 percent silica, less than 45 percent reduction and at 7.4 percent silica, less than 40 percent reduction.

The sharp drop in reduction rate following initial rapid reduction is based on the development of an FeO-rich silica slag phase which acts to block further reduction. To inhibit development of this slag block, the silica was prefluxed with lime during induration prior to reduction. Calcium hydroxide was added to 4.9 percent silica concentrate prior to formation of the compacts in amount, 6.0 percent by weight, fluxing the compacts to a basicity of 1.0. (The 6.0 percent calcium hydroxide is equivalent to 4.6 percent calcium oxide or 8.2 percent limestone and yields a molecular ratio of $CaO/SiO_2 = B/A = 1$ at 4.9 percent silica.) After induration, reduction rates were observed at 1100°, 1200°, 1250° and 1300° C. The reduction of the fluxed pellets goes to completion at all temperatures within twenty-five minutes, whereas reduction of the comparative unfluxed pellets is blocked at 1200° C.

The advantage of the new concept is that conventional taconite pellets which may contain several percent silica can be subjected successfully to direct reduction to metallic iron in a suitable reactor at temperatures in the 1100° to 1300° C range without fusion. This provides the practical means by which present taconite operations which produce oxide pellets can be converted to the production of metallized pellets with a substantially lower capital investment and fuel requirement than previously considered possible. The cost savings come from: (1) lower capital cost for reactor units because of the relatively rapid reduction rates attainable at the higher temperatures; hence smaller reactors are required; (2) lower fuel requirements because of the savings in the preheating stage which takes the indurated pellet into the process at temperature; and (3) because of the high temperature of the operation the product is nonpyrophoric and stable in air and will not require careful cooling to room temperature, or protection with an inert gas cover.

The invention provides a practical means by which conventional taconite pellets, if properly fluxed with lime, can be rapidly and efficiently reduced to metallic iron at significantly lower cost than present direct reduction operations which must take place at lower temperatures. This removes some of the present restrictions on the applicability of direct reduction facilities because it opens up a greater market than is available if the product must stand only as a substitute for scrap iron to the conventional electric furnace. Because of the substantial fuel saving of this direct reduction process, it is possible to consider large scale iron-making operations which are highly competitive with the present blast furnace and coke oven complex.

It is apparent that many modifications and variations of this invention as hereinbefore set forth may be made without departing from the spirit and scope thereof.

The specific embodiments described are given by way of example only and the invention is limited only by the terms of the appended claims.

The embodiments of the invention in which an exclusive property or privilege is claimed are defined as follows:

1. A rapid high temperature direct reduction process for high silica, low alumina magnetitic iron ore agglomerates in which the silica is prefluxed to prevent the reduction inhibiting effect of the formation of FeO-silica slag, which process comprises:
  A. admixing finely divided taconite concentrate containing more than about 2.5 percent free silica by weight with finely divided lime selected from the class consisting of burnt lime, lime hydrate and limestone,
  B. adding said lime in amount sufficient to react with said free silica to reduce the same to less than about 2.5 percent,
  C. forming the ore-lime mixture into agglomerates,
  D. heating said agglomerates to a temperature between about 1100° and 1300° C to substantially completely react said lime with at least said free silica in excess of 2.5 percent to flux the agglomerates to a basicity of about 1, and
  E. while at said temperature subjecting said agglomerates to a reducing atmosphere rich in reducing gases selected from the class consisting of hydrogen, carbon monoxide, and mixtures containing the same at a high temperature between about 1100° and 1300° C for a time sufficient to achieve substantially complete reduction of said ore.

2. A rapid high temperature direct reduction process for high silica, low alumina magnetitic iron ore agglomerates in which the silica is prefluxed to prevent the reduction inhibiting effect of the formation of FeO-silica slag, said process comprising:
  A. admixing lime with finely divided iron ore concentrates containing more than about 2.5 percent free silica by weight, said lime being added in amount to react with said free silica to reduce the same to less than about 2.5 percent by weight,
  B. agglomerating the iron ore concentrate-lime mixture,
  C. heating said agglomerated mixture to a temperature between about 1100° and 1300° C, and
  D. without substantial cooling subjecting the agglomerated mixture to a reducing atmosphere at a high temperature between about 1100° and 1300° C.

3. A process according to claim 2 further characterized in that said lime is added in amount to react with said free silica to reduce the same to less than about 1.5 percent.

4. A process according to claim 2 further characterized in that said lime is finely divided and added in the form selected from the class consisting of burnt lime, lime hydrate and limestone.

5. A process according to claim 2 further characterized in that said iron ore is taconite concentrate.

6. A process according to claim 2 further characterized in that said ore-lime mixture is aggglomerated by balling and indurated at a temperature between about 1100° and 1300° C.

7. A process according to claim 6 further characterized in that said agglomerated ore-lime mixture is subjected to reduction immediately following induration.

8. A process according to claim 6 further characterized in that said agglomerated ore-lime mixture, without induration, is preheated to a temperature between about 1100° and 1300° C and then subjected to reduction.

9. A process according to claim 6 further characterized in that bentonite is admixed with said ore-lime mixture.